United States Patent [19]

Morwing

[11] 4,438,392

[45] Mar. 20, 1984

[54] DEVICE FOR SAMPLING AND HOLDING THE CARRIER FREQUENCY OF SHORT DURATION PULSES

[75] Inventor: Bo A. Morwing, ASA Station, Sweden

[73] Assignee: Telefonaktiebolaget L M Ericsson, Stockholm, Sweden

[21] Appl. No.: 287,711

[22] PCT Filed: Dec. 4, 1980

[86] PCT No.: PCT/SE80/00312

§ 371 Date: Jul. 31, 1981

§ 102(e) Date: Jul. 31, 1981

[87] PCT Pub. No.: WO81/01616

PCT Pub. Date: Jun. 11, 1981

[30] Foreign Application Priority Data

Dec. 4, 1979 [SE] Sweden ............................ 7909984-2

[51] Int. Cl.³ .............................................. G01R 23/14
[52] U.S. Cl. .................................. 324/79 R; 324/78 E
[58] Field of Search ............... 324/78 R, 78 D, 78 E, 324/78 Z, 79 R, 79 D; 331/11, 14; 455/1, 13, 119; 343/17.5, 17.7, 7 A

[56] References Cited

U.S. PATENT DOCUMENTS

| 2,905,894 | 9/1959 | Rudmann | 324/79 R |
| 3,609,575 | 9/1971 | Sherry | 324/79 R |
| 3,968,431 | 7/1976 | Ekstrom | 324/78 E |

*Primary Examiner*—Michael J. Tokar
*Attorney, Agent, or Firm*—Hane, Roberts, Spiecens & Cohen

[57] ABSTRACT

A device for measuring the frequency of a pulsed carrier signal in which the carrier frequency is situated within the frequency range and to give a continuous signal whose frequency is equal to the measured carrier frequency. A frequency discriminator (3) gives an analog voltage via a track-and-hold circuit (4) and a DC-amplifier (15) to one input of a comparator (6) whose second input receives the analog voltage from the discriminator (3). The difference value from the comparator (6) is supplied to a voltage controlled oscillator (8). This is via a directional coupler or duplexer (9) and a controllable switch (1) connected to the frequency discriminator (3) which alternatively receives the input signal to the device and the output signal from the voltage controlled oscillator (8).

1 Claim, 4 Drawing Figures

DEVICE FOR SAMPLING AND HOLDING THE CARRIER FREQUENCY OF SHORT DURATION PULSES

TECHNICAL FIELD

The present invention relates to a device for sampling and regenerating the carrier frequency of each of the individual pulses in an incoming pulsed carrier frequency signal. The device according to the invention can, for example, be included as a part in a radar receiver, the carrier frequency being situated within the microwave range.

BACKGROUND ART

In, for example, the radar art it is frequently necessary to sample the frequency of the individual pulses in an incoming pulse train to the receiver. This can cause problems, especially, when every incoming pulse has a very short duration and particularly when the carrier frequency varies from one pulse to another. The incoming signal consists, for example, of pulses having mutually different frequency values, which for example, constitutes the signal from different radar stations. The device should after the sampling deliver a signal with the same frequency as the received carrier. Examples of known circuits or systems for this purpuse is described in, for example, the U.S. Pat. No. 3,996,588.

DISCLOSURE OF INVENTION

A general object of to the present invention is to solve such problem. During the duration of a pulse the value of the carrier frequency of the pulse is measured by means of a frequency discriminator, the thus measured value is then supplied to a voltage controlled oscillator as a control quantity. This control quantity is allowed to control the oscillator to a frequency approximately equal to or in the neighbourhood of the received frequency during the short time interval of the carrier frequency pulse duration. During the subsequent longer time interval (or part thereof), when no carrier frequency pulse is received the device works as a closed loop and the voltage controlled oscillator is controlled by the value of a difference signal and is adjusted to a frequency value near the value of the carrier frequency pulse detected during the previous time interval.

The novel and the characterizing of the present device is a track-and-hold circuit and an amplifier connected between the frequency discriminator and the voltage controlled oscillator. A continuous signal which follows the output signal from the discriminator is delivered on the one hand directly and on the other hand via a track-and-hold circuit and the amplifier to a difference forming circuit and during the time interval of the pulse duration. The output signal of the difference circuit controls the oscillator. During the subsequent longer time interval the last measured value from the discriminator is stored in the track-and-hold circuit and the oscillator is controlled in dependence on the difference between a value corresponding to the oscillator frequency and the stored value.

Accordingly, a continuous control of the voltage controlled oscillator is attained already from the beginning of a carrier frequency pulse, i.e. sudden changes in the oscillator control is avoided which implies a more rapid and reliable measuring and adjusting of the carrier frequency.

A specific object of the present invention is thus to provide a device to rapidly and securely sample and regenerate the carrier frequency of received pulses in a pulse train where the carrier frequency can vary from one pulse to another and to give an accurate determined analog counterpart to every detected and measuring frequency, for example in the form of a direct voltage.

BRIEF DESCRIPTION OF DRAWINGS

The invention will be closer described with reference to the accompanying drawings in which.

MODE FOR CARRYING OUT THE INVENTION

Figure 1:
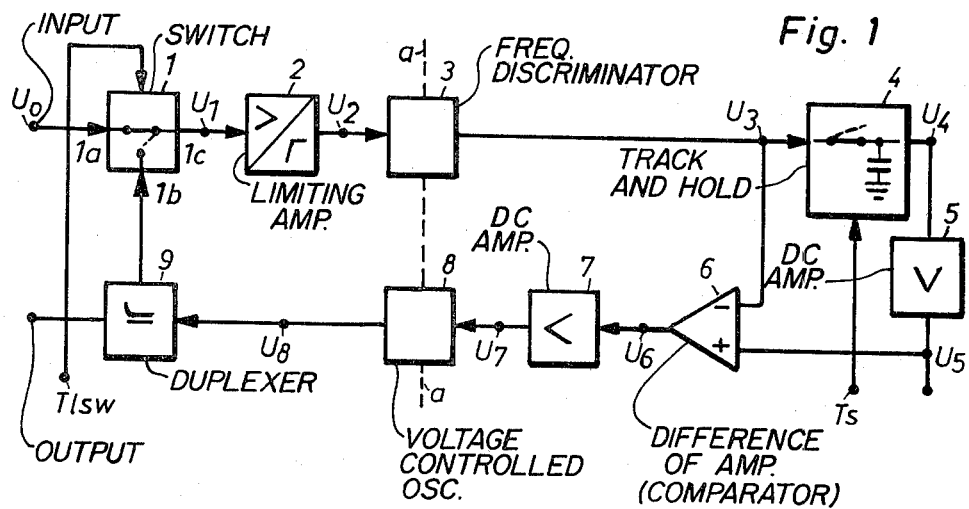
FIG. 1 shows a block diagram of the device according to the present invention.
Figure 2:
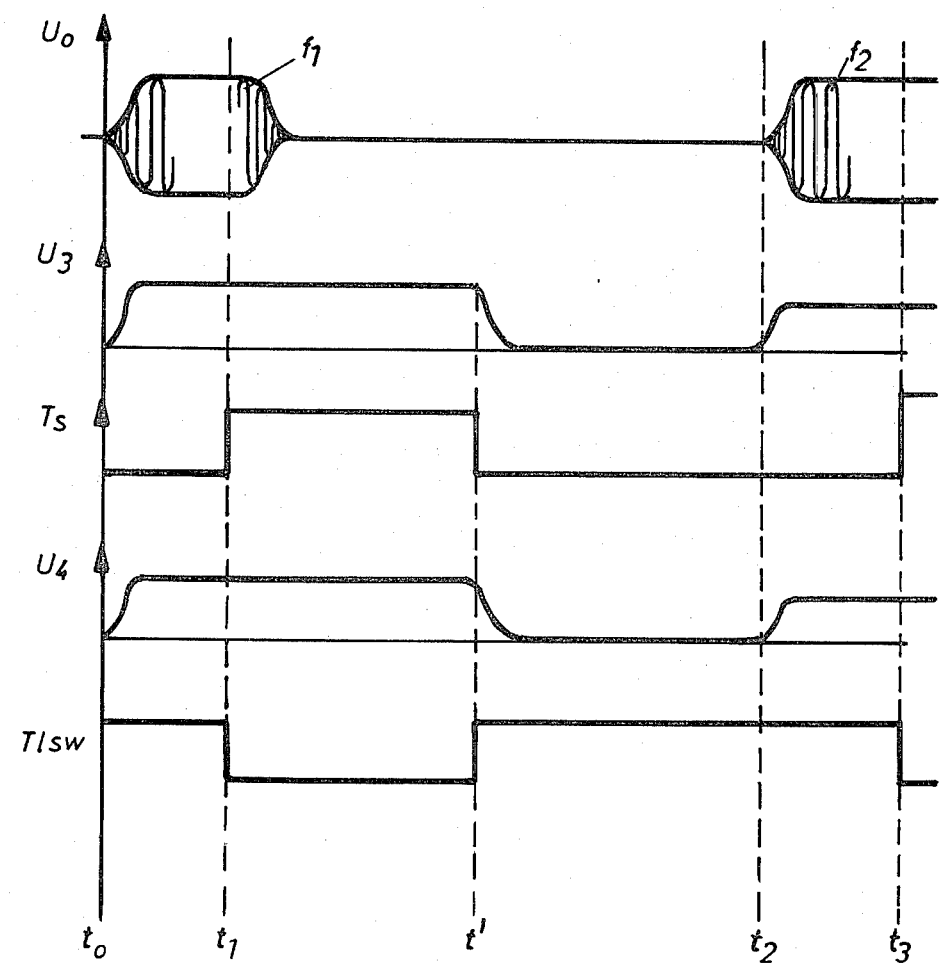
FIG. 2 shows a timing diagram in order to explain the function of the track-and-hold circuit which is included in the dvice according to the invention.

The block diagram according to FIG. 1 shows a device according to the invention. The block 1 designates a du path controlled switch having one input 1a receiving the signal U0. Signal U0 is shown in FIG. 2 consisting of a pulsed carrier frequency signal whose frequency $f_1$, $f_2$ ... from one pulse to another is to be measured. When the device is used in, for example, a radar receiver the frequencies $f_1$, $f_2$ are situated within the microwave range. The other input 1b of the switch 1 is connected to a duplexer 9. The output 1c is connected to a frequency discriminator 3 via an amplifier-limiting stage 2. Across the output of the discriminator 3 an analog signal quantity U3 is obtained whose value depends on the frequency value of the incoming microwave signal U2 from the amplifier stage 2. The discriminator 3 is assumed to be linear, i.e. the value of the analog signal U3 is directly proportional to the detected frequency with a proportion factor Kd (V/MHz). The output of the discriminator 3 is connected on the one hand to the input of a track-and-hold circuit 4 and an the other hand to the minus input of an operational amplifier 6. THe track-and-hold circuit 4 is with its output connected via a DC-amplifier 5, with the amplification $K_1$, to the pulse input of the operational amplifier 6, the output signal (DC-voltage) from the amplifier 5 being designated U5, and forms the amplified value of the signal U4. The operational amplifier 6 then constitutes a difference forming circuit or a comparator, which compares the quantities U3 and U5. A difference signal is formed which is fed via a second DC-amplifier 7 with the amplification K2 to a voltage controlled oscillator (VCO) 8. This is assumed, like the discriminator 3, to be linear and is characterized by the factor $K_V$ (MHz/V), a signal U8 being delivered whose frequency is situated within the microwave range and the value being dependent of the value of the analog quantity U7 from the amplifier 7.

The signal U8 is delivered via the duplexer 9 on the one hand to the second input of the switch 1 and on the other hand to the output of the device which can be connected to a utilization device (not shown). In the diagram according to FIG. 1 thus microwave signals appear to the left of the dashed line a—a and analog signals in the form of DC-voltages to the right of the line a—a.

Before describing the operation of the circuit, briefly the function of the track-and-hold circuit 4 will be discussed with reference to the timing diagram according to FIG. 2. At the time $t_0$ and during the time interval $t_0$–$t_1$ the control signal Tlsw to the switch 1 is such that the contacts are in the position 1a–1c, signal U1 being equal to signal U0. The control signal Ts is then such that the track-and-hold circuit 4 is fully conducting, i.e. signal U4 is equal to signal U3. The input signal U0 consists, for example, of a pulsed carrier frequency signal as shown in FIG. 2 having a low value duty cycle of the magnitude 1/1000. The input signal U2 to the frequency discriminator thus consists of a pulse train with short duration pulses, where the carrier frequency can vary from one pulse to another. The leading edge of the pulse coincides mainly with the instant $t_0$ while its trailing edge appears at the instant $t_1$ or at some instant later. During the time $t_0$–$t_1$ the carrier frequency is measured by the discriminator 3, the output signal U3 consisting of an analog signal whose value is proportional to the frequency of the pulse. The signal U3 is after that conducted unchanged through the closed track-and-hold circuit 4.

At the time $t_1$ a control pulse Ts is delivered to the track-and-hold circuit which implies the value of the signal U3 at the time $t_1$ "is frozen" (stored), so that the output signal U4 consists of an analogue signal with a constant value during the interval $t_1$–$t'$ (equal to the value U3 at the time $t_1$). At the same time, $t_1$, the switch 1 is changed by the signal Tlsw to the position 1b–1c. At the time $t_2$ the track-and-hold circuit is switched so that the signal U3 is completely let through (as at the time $t_0$) and the process is repeated. The circuit 4 can as is known consist of a series-parallel-circuit of a switch (for example a transistor) in the series path and a capacitor in the parallel path.

When the switch is closed, the capacitor is charged to the value of the signal U3 (the interval $t_0$–$t_1$) and when the switch is disconnected (the interval $t_1$–$t'$) the capacitor charge (-voltage) constitutes the holding value. The circuit 4 thus "tracks" the input signal during the time interval $t_0$–$t_1$, $t_2$–$t_3$ and "holds" (stores) during the interval $t_1$–$t'$ the value of the input signal which last appeared.

Figure 3:
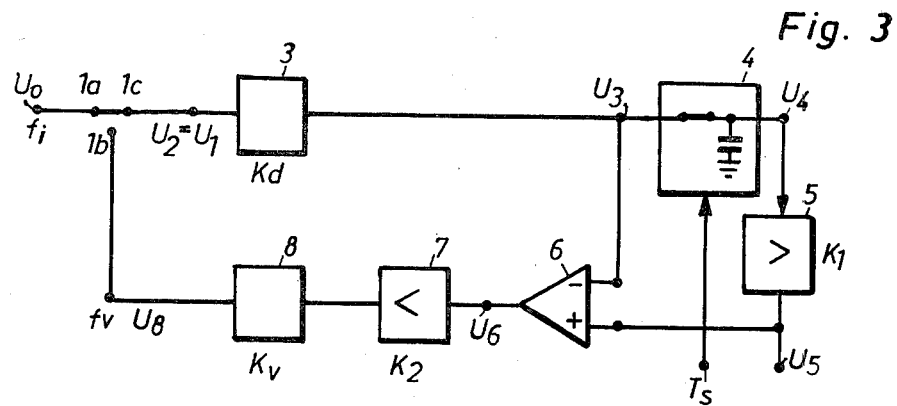
FIG. 3 shows a block diagram equivalent with FIG. 1 during the time interval the device forms an open control loop.
Figure 4:
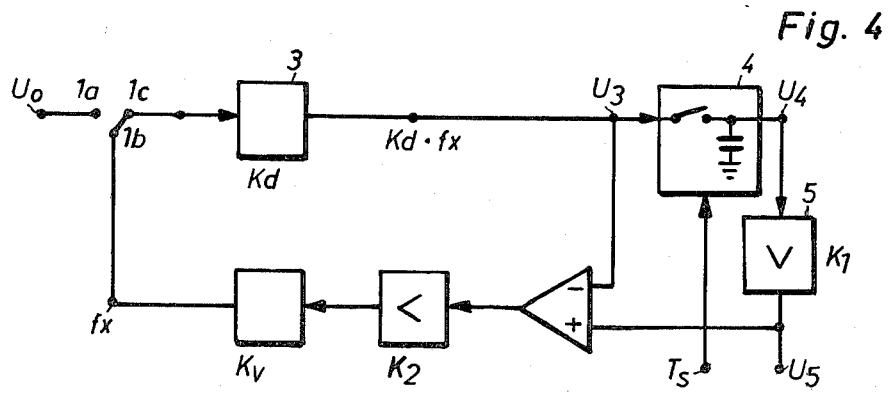
FIG. 4 shows a circuit diagram equivalent with FIG. 1 during the time interval the device forms a closed loop.

The operation of the frequency sampling circuit will now be more fully described with reference to FIGS. 3 and 4 where FIG. 3 shows the circuit during the time interval $t_0$–$t_1$, $t_2$–$t_3$ (open loop) and FIG. 4 shows the circuit during the interval $t_1$–$t'$ (closed loop). The discriminator 3 and the voltage controlled oscillator 8 are assumed to be linear with the factors Kd (V/MHz) and Kv (MHz/V), respectively. Each of the amplifiers 5 and 7 is assumed to have a linear characteristic with the amplification factor $K_1$ and $K_2$, respectively. Then following is valid:

$U4 = U3 = Kd \times fi$ (fi is the frequency of the carrier wave pulse)

$U5 = K_1 \times Kd \times fi$ $U6 = Kd \times fi \times (K_1 - 1);\ K_1 \neq 1,$ the frequency fv of the output signal U8 from the voltage controlled oscillator 8 being: $fv = Kx(K_1 - 1) \times fi\ ..$
. (1) if $Kv \times K_2 \times Kd = K$. During this time interval a signal U3 is fed to the track-and-hold circuit 4 which varies according to the frequency of the input signal and thus a likewise varying input signal U7 to the oscillator 8. The frequency fv thus varies but is proportional to the frequency fi of the input signal U1.

FIG. 4 shows the circuit during the time interval $t_1$–$t'$. The loop is now closed and the track-and-hold circuit 4 delivers a constant signal to the amplifier 5, which is fed to the plus input of the amplifier 6. Across the minus input a signal U3 is fed, which is proportional to the frequency fx of the voltage controlled oscillator. The following relations can be set:

$fx = Kv \times K_2 \times (K_1 \times Kd \times fi - Kd \times fx) = K \times K_1 \times fi - K \times fx$ which gives $fx = [(K \times K_1)/(1 + K)] \times fi$.
If $K_1 = 1 + 1/K$, it is obtained $fx = fi$ This implies that the frequency of the voltage controlled oscillator has been controlled to exactly the same value as the received carrier frequency.

Putting the value $K_1 = 1 + 1/K$ into the equation (1) it is obtained:

$fv = fi$ i.e. also the frequency of the output signal from the oscillator 8 during the interval $t_0$–$t_1$ is exactly the same as the received carrier frequency.

By means of the described device an oscillator can be held to the carrier frequency of a sampled short duration pulse from the beginning of the sample of the pulse and controlled to the sampled value after the pulse and that this is carried out without any control error and that at the output of the amplifier 5 the signal $K_1 \times K_d \times fi$ which thus constitutes an accurate analog signal proportional to the incoming carrier frequency.

What we claim is:

1. A carrier frequency sample and hold circuit comprising switching means controllably switching between a first input adapted to receive a carrier frequency pulse signal of low duty cycle, a second input and an output, frequency discriminator means for converting the carrier frequency signal to an analog signal having an amplitude which is a function of the frequency of an input signal, said frequency discriminator having an input connected to the output of said switching means and an output, an analog track and hold means periodically switchable between a track and hold mode in synchronism with said switching means, said analog track and hold means having an input connected to the output of said frequency discriminator means and an output, a difference amplifier means having first and second inputs connected respectively to the outputs of said frequency discriminator means and said track and hold means and an output, voltage controlled oscillator means for emitting a signal having a frequency related to the amplitude of a received signal, said voltage controlled oscillator means having an input connected to the output of said difference amplifier means and an output connected to the other input of said switching means, and utilization means connected to the output of said voltage controlled oscillator means.

* * * * *